US006936151B1

(12) United States Patent
Lock et al.

(10) Patent No.: US 6,936,151 B1
(45) Date of Patent: Aug. 30, 2005

(54) MANIPULATION OF PARTICLES IN LIQUID MEDIA

(75) Inventors: Gary Lock, Middlesex (GB); Ronald Pethig, Gwynedd (GB); Gerardus Hendricus Markx, Derbyshire (GB)

(73) Assignee: University of Wales, Bangor, Gwynedd (GB)

( * ) Notice: Subject to any disclaimer, the term of this patent is extended or adjusted under 35 U.S.C. 154(b) by 91 days.

(21) Appl. No.: 10/031,363

(22) PCT Filed: Jul. 20, 2000

(86) PCT No.: PCT/GB00/02803

§ 371 (c)(1), (2), (4) Date: Jul. 1, 2002

(87) PCT Pub. No.: WO01/05513

PCT Pub. Date: Jan. 25, 2001

(30) Foreign Application Priority Data

Jul. 20, 1999 (GB) .................................. 9916851

(51) Int. Cl.[7] .................. G01N 21/447; G01N 27/453; B03C 5/02

(52) U.S. Cl. ...................... 204/547; 204/643; 210/748

(58) Field of Search ............................... 204/547, 643; 210/748

(56) References Cited

U.S. PATENT DOCUMENTS

RE33,524 E * 1/1991 Schram ..................... 210/748

FOREIGN PATENT DOCUMENTS

SU 744285 * 6/1980
WO WO 98/04355 * 2/1998

OTHER PUBLICATIONS

Certified translation of SU 744,285 publication dated Jun. 1980.*

* cited by examiner

*Primary Examiner*—Kaj K. Olsen
(74) *Attorney, Agent, or Firm*—Breiner & Breiner, LLC

(57) ABSTRACT

In a method of manipulating particles suspended in a liquid medium, a moving standing wave ultrasonic vibration and an electrical field capable of generating a dielectrophoretic force on the particles are applied. The ultrasonic vibration may be applied to move the particles from a first suspending liquid to a second suspending liquid, or to move the particles into proximity with electrodes to apply the dielectrophoretic force, or to move the particles into the center of the liquid medium. Alternatively, the ultrasonic vibration and the electrical field may be applied simultaneously.

2 Claims, 5 Drawing Sheets

MANIPULATION OF PARTICLES IN LIQUID MEDIA

This invention relates to the manipulation of particles in liquid media.

In recent years, much attention has been directed to the development of systems for manipulating particles in liquid media. The purposes for which particles may be usefully manipulated in liquid media are many and varied. For example, many different types of separation process make use of the fact that particles of differing types may be separated within a volume of liquid with particles then being drawn off from a specific point located within the volume of liquid, the particles being so drawn off then being of a different character from other particles drawn off from other points within the volume. Such separation processes may be expanded in application to non-particulate materials, for example large molecules or biological entities if they can be associated with carrier particles to form enhanced particles which then have different properties allowing their separation. Another area of increasing importance is the promotion of desired reactions, usually on a microscopic scale, by bringing reactants into contact, the reactants either being in particulate form themselves or one or more of them being in the form of some form of particle having associated with it a generally non-particulate reactant.

Throughout this specification, the term "particle" is used to include biological cells, bacteria, viruses, parasitic microorganisms, DNA, proteins, biopolymers, non-biological particles, or any other particle which may be suspended in a liquid, in which dielectrophoretic and ultrasonic forces can be induced. It also applies to chemical compounds or gases dissolved or suspended in a liquid, where dielectrophoretic and ultrasonic forces can be induced. It further includes any particles which can be attached to larger particles, in which dielectrophoretic and ultrasonic forces can then be induced.

Two basic types of movement of a particle in a liquid medium may be easily identified, viz. the bulk movement of particles in a liquid medium as a result of bulk movement of the liquid medium itself and movement of the particles relative to the surrounding liquid medium where the medium may be thought of as essentially stationary. Of course, in the practical applications involving the manipulation of particles in a liquid medium, both sorts of movement occur.

In recent years, much progress has been made in harnessing the physical phenomenon known as dielectrophoresis to produce useful particle manipulation effects. As examples, reference may be made to papers by Markx et al, Dielectrophoretic Characterisation and Separation of Microorganisms, Microbiology (1994), 140, pages 585–591, and Pethig, Dielectrophoresis: Using Inhomogeous AC Electrical Fields to Separate and Manipulate Cells, Critical Review in Biotechnology, 16(4), pages 331–348 (1996). As can be seen by the extensive reference lists in both of these two papers, there has been much activity in the area of applying dielectrophoresis.

The patent literature also contains disclosures of dielectrophoretic separation methods as well as generalised particle manipulation methods using dielectrophoresis. Reference is made to International Publications WO 91/11262, WO 93/16383, WO 94/22583, WO 97/34689 and U.S. Pat. No. 5,454,472 in this connection.

We have now found that significant advantages in the manipulation of particles may be achieved by using, in combination with dielectrophoretic methods of manipulating them, ultrasonic manipulation.

Such a combination has been disclosed in a limited way in USSR Author's Certificate No 744285, Fomchenkov and Miroshnikov in which a cylindrical dielectrophoretic chamber is surrounded by a coaxial ultrasound transducer, and an ultrasound signal and a dielectrophoretic signal are applied at the same frequency in the same radial direction, and at synchronised phases. The diameter of the cylindrical chamber does, not exceed the length of the ultrasound wave.

It is stated that "The geometric dimensions of the ultrasound radiator 8 are selected so that the place where the chamber is positioned a standing wave is generated, the rate of oscillation of which is directed over the whole cross-section of the chamber along the radius in the direction toward the axial electrode or away from it. In this way, the diameter of the chamber does not exceed the length of the ultrasonic wave", then goes on to state "The oscillatory frequency of the sources 16 and 17 are selected to be the same and their phases synchronised using synchroniser 18". Sources 16 and 17 refer to the signal sources for the ultrasound and dielectrophoresis, and as such the signals utilised for both the ultrasound and dielectrophoresis are at the same frequency with their phases linked. The reason for utilising the same frequency and linking their phase is given later where it is also stated "as a result, dispersed particles are polarised first by the electrical field and secondly by the ultrasonic field which attaches to them an additional electrical dipolar moment caused by the deformation of their double electrical layer. The interaction of the combined dipolar moment of a particle with the electrical field leads to a force arising directed in the region of maximum field strength at the axial electrode 4".

A disadvantage of such an arrangement is that the constraints imposed on the ultrasound frequency range (e.g. 1 to 6 MHz) by the chamber size also restricts the dielectrophoretic response correspondingly to a very small range. For dielectrophoresis to be of practical utility, a frequency range extending from at least 1 kHz to 10 MHz is required.

We have now found that such a frequency range can be achieved by use of the method and apparatus according to the present invention.

Further, in Fomchenkov, an external fluid flow is additionally required to achieve particle separation; separation cannot be achieved by use of ultrasound and dielectrophoretic forces alone. We have now found that by use of a method and apparatus according to the invention, particle separation can be achieved without the use of a fluid flow.

According generally to the present invention, there is provided a method of manipulating particles comprising subjecting particles suspended in a liquid to a moving ultrasonic standing wave and to a varying electrical field capable of generating a dielectrophoretic force on the particles.

In contrast to the arrangement of Fomchenkov, the relative phases of the two signals need not be controlled.

Also according to the invention a method of manipulating particles comprising subjecting particles suspended in a liquid to an ultrasonic vibration and to a varying electrical field capable of generating a dielectrophoretic force on the particles, the ultrasonic vibration and the varying electrical field being of different frequencies.

Further according to the invention a method of manipulating particles comprising subjecting particles suspended in a liquid to an ultrasonic vibration and to a varying electrical field capable of generating a dielectrophoretic force on the particles, the ultrasonic vibration and the varying electrical field being applied in different planes.

Yet further according to the invention apparatus for treating particles suspended in a liquid comprising a chamber, means for feeding suspended particles into and out of the chamber, an electrode array on at least one wall of the chamber, means for applying to the electrode array an alternating electrical potential whereby to generate in suspended particles adjacent to the array a dielectrophoretic force, and means for subjecting the liquid in the chamber to a moving ultrasonic standing wave.

The technique of applying ultrasound to manipulate particles in a liquid medium has been previously disclosed, for example in a paper by Peterson et al. "Development of an ultrasonic blood cell separator" IEEE eighth annual conference of the Engineering in Medicine and Biology Society, 1986, pages 154 to 156.

As reflected in that paper, the ultrasonic force on a compressible particle caused by a standing acoustic pressure wave is given by $$F_{Ultra} = \frac{\pi R^3 p^2 k}{3\rho_0 c_0^2} \sin(2kx)\left[\frac{1}{\delta\sigma^2} - \left(\frac{5\delta - 2}{2\delta + 1}\right)\right] \equiv b \cdot R^3$$

The dielectrophoretic (DEP) force exerted on a particle, as reflected in the paper by Markx et al referred to above at page 585, is given by $$F_{DEP}(\omega) = 2\pi\epsilon_0\epsilon_m R^3 \; Re\left[\frac{\sigma_p^* - \sigma_m^*}{\sigma_p^* - \sigma_m^*}\right]\nabla E^2 \equiv a \cdot R^3 \text{(r.m.s.)}$$

The explanation of the meanings of the symbols used in these two equations is given in the respective papers, and in the two equations noted above, it will be noted that, as reflected by the equivalences, the force is directly dependent upon the cube of the radius of the particle, all other things being equal. In other words, the force is dependent upon particle volume.

Clearly, by adjusting the conditions, i.e. by varying the parameters of the ultrasound and varying electrical fields applied, the arbitrary constants a and b may be made the same, i.e. the dielectrophoretic force acting on a particle can be made greater than, equal to, or less than the ultrasonic force exerted on that particle. Because both of the forces are dependent upon the particle volume, variations in volume do not affect the ability to apply a balance of ultrasonic and dielectrophoretic forces or to make one exceed the other. Accordingly, the ability to manipulate the particles becomes effectively independent of their volume, and this enables much enhanced manipulations to be carried out. In particular, the relative size of particles has no effect on their ability to be separated using techniques involving the combined application of ultrasonic and dielectrophoretic forces to them.

In practical application of the method of the present invention, the dielectrophoretic and ultrasound forces may be applied simultaneously, but in addition they may be applied sequentially to secure appropriate movement of the particles. In particular, ultrasonic irradiation may be used in the absence of any dielectrophoretic force being applied to the particles to move particles in suspension in a liquid medium in a desired fashion. In accordance with a particularly valuable method according to the invention, ultrasonic irradiation is first used to move particles to be manipulated from a first liquid medium in which they are suspended into a second liquid medium, the conductivity, dielectric permittivity, pH and other physico-chemical properties of the second liquid medium being appropriate for enabling the generation of appropriate dielectrophoretic force on the individual particles. This is particularly valuable in connection with separation processes using dielectrophoresis since it provides an alternative to the customarily used centrifugation of the particles so that they may be removed from the first suspending liquid and then re-dispersed in a second known liquid, typically having characteristics, such as chosen conductivity value, to aid dielectrophoretic separation.

In like fashion, particles which have been subjected to dielectrophoretic separation, for example in accordance with some of the prior art techniques set out above, may be subjected to ultrasound in order to cause the particles effectively to concentrate together, or even sediment out from the liquid medium in which they have been suspended during the dielectrophoretic separation. This concentration process may be used to increase the efficiency of practical separation apparatus.

As disclosed in the extensive prior art relating to dielectrophoretic manipulation referred to above, in order to generate adequate dielectrophoretic forces, the particles must be located in close proximity to electrical field-generating electrode arrays. Conventionally, this is often achieved simply by using gravity to allow particles in suspension to congregate adjacent electrode surfaces, but this can take a substantial time, particularly if the relative densities of the particles and the suspending liquids are close. We have found that by using ultrasonic manipulation, particles suspended in a liquid may be moved into close proximity with a suitable electrode array rapidly. By using a moving standing ultrasonic wave, it is also possible to move particles across an electrode array.

In the practical application of the method of the present invention, apparatus is used which is constructed and adapted to enable the particles to be subjected to both ultrasonic and dielectrophoretic forces. Accordingly, in a further aspect, the present invention provides apparatus for treating particles suspended in a liquid medium including a chamber, means for feeding suspended particles into and out of the chamber, an electrode array on at least one wall of the chamber, means for applying to the electrode array an alternating electrical potential whereby to generate in suspended particles adjacent the array a dielectrophoretic force, and means for subjecting the liquid in the chamber to ultrasonic vibration. In particular, the means for subjecting liquid in the chamber to ultrasonic vibration may be adapted to create a standing ultrasonic wave within the liquid in the chamber whereby particles suspended in the liquid will move to areas of either low or high ultrasonic pressure, nodes or anti-nodes. The particles will thus be formed into bands at the nodes or anti-nodes, and by changing the relative positions of these nodes, the particles may then be moved.

With an appropriately dimensioned treatment chamber, i.e. one which is narrow relative to the wavelength of the ultrasound used, it is possible to make particles move towards the walls of the chamber on which electrode structures are located. Thus, in a typical application, a volume of liquid having suspended in it particles requiring separation according to some appropriate criterion can be introduced into a chamber, the chamber then subjected to ultrasound to move the particles to the walls of the chamber, and thereafter the particles on the walls which bear electrode arrays can be separated using a combination of ultrasonic forces and dielectrophoretic forces exerted on them.

Using the methods of the present invention in this way, substantial separation efficiency may be achieved compared with the use of dielectrophoretic separation methods alone. In particular, by using combined ultrasound and dielectrophoretic forces, particles may be separated on the basis of both their mechanical and dielectric properties. Since both ultrasound and dielectrophoretic forces can be precisely controlled, better control of particle separation is possible, in comparison with use of fluid flow.

Dielectrophoretic forces are inherently short-range in their effect and so either a significant time must be allowed for particles to sediment on to the electrodes, or the apparatus must be arranged so that the particles are within a short distance of the electrodes, typically no more than 300 μm, and preferably no more than 100 μm. Ultrasound can be utilised to move cells rapidly on to the electrodes at chamber walls to facilitate efficient dielectrophoretic separation subsequently; for the conditions where the chamber height is in the order of the wavelength of the sound wave, cells start to move toward the walls of the chamber; (the exact dimensions will depend on the manner in which the ultrasound is applied and also the acoustic properties of the chamber walls). The wavelength of ultrasound in water at 20° C., for an ultrasound frequency range of 500 kHz to 10 MHz, is around 150 to 3000 microns, so the dielectrophoresis chamber may be an order of magnitude larger than a chamber employing no ultrasound.

The invention is illustrated by way of example with reference to the accompanying drawings in which.

Figure 4A:
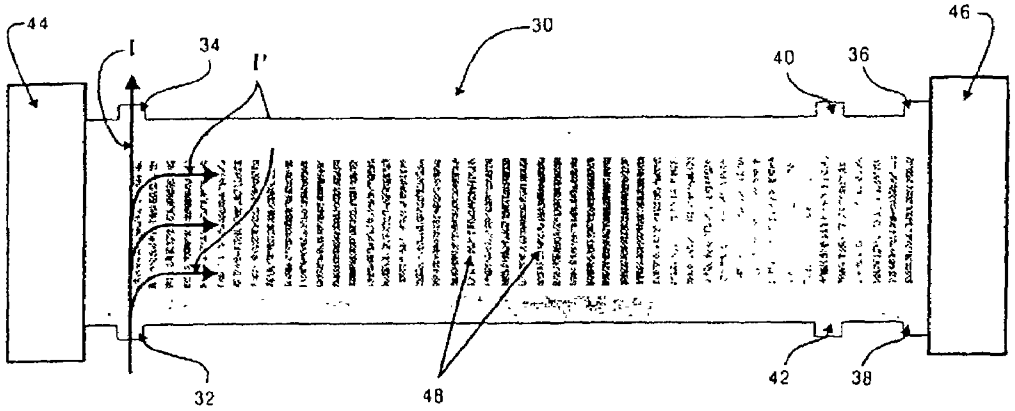
FIGS. 4A and 4B illustrate an alternative separation cell.
Figure 4B:
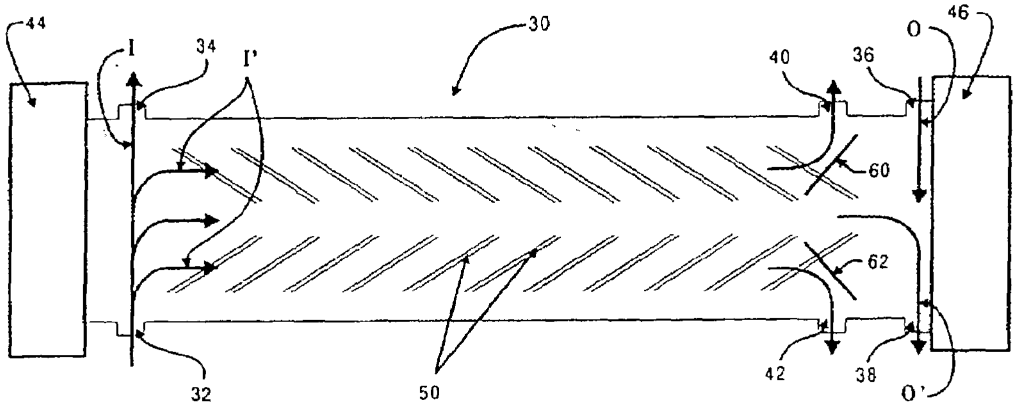
Figure 4C:
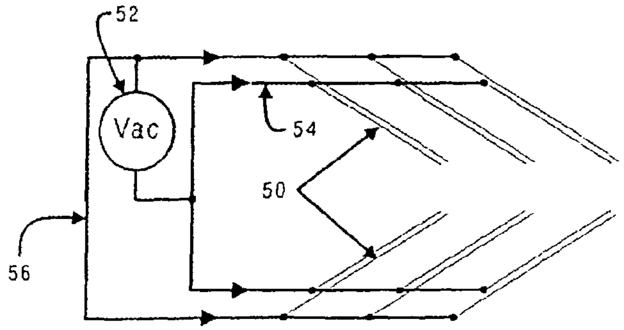
Figure 4D:
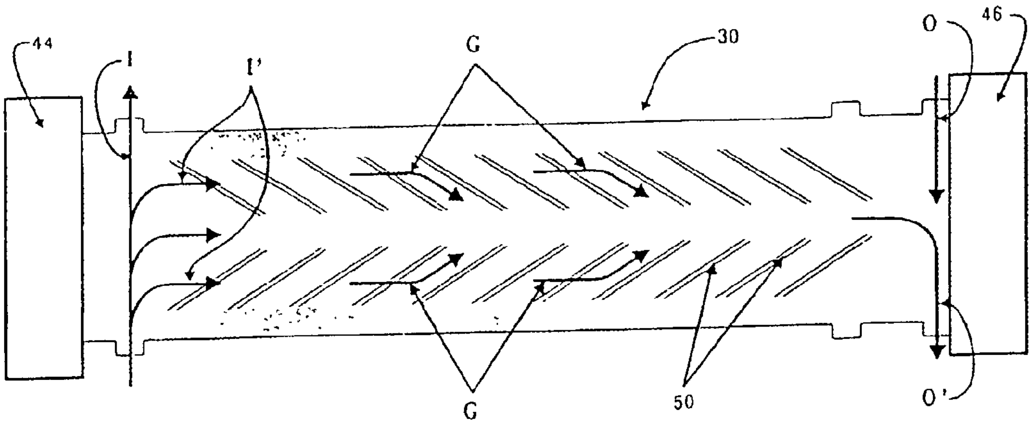
Figure 4E:
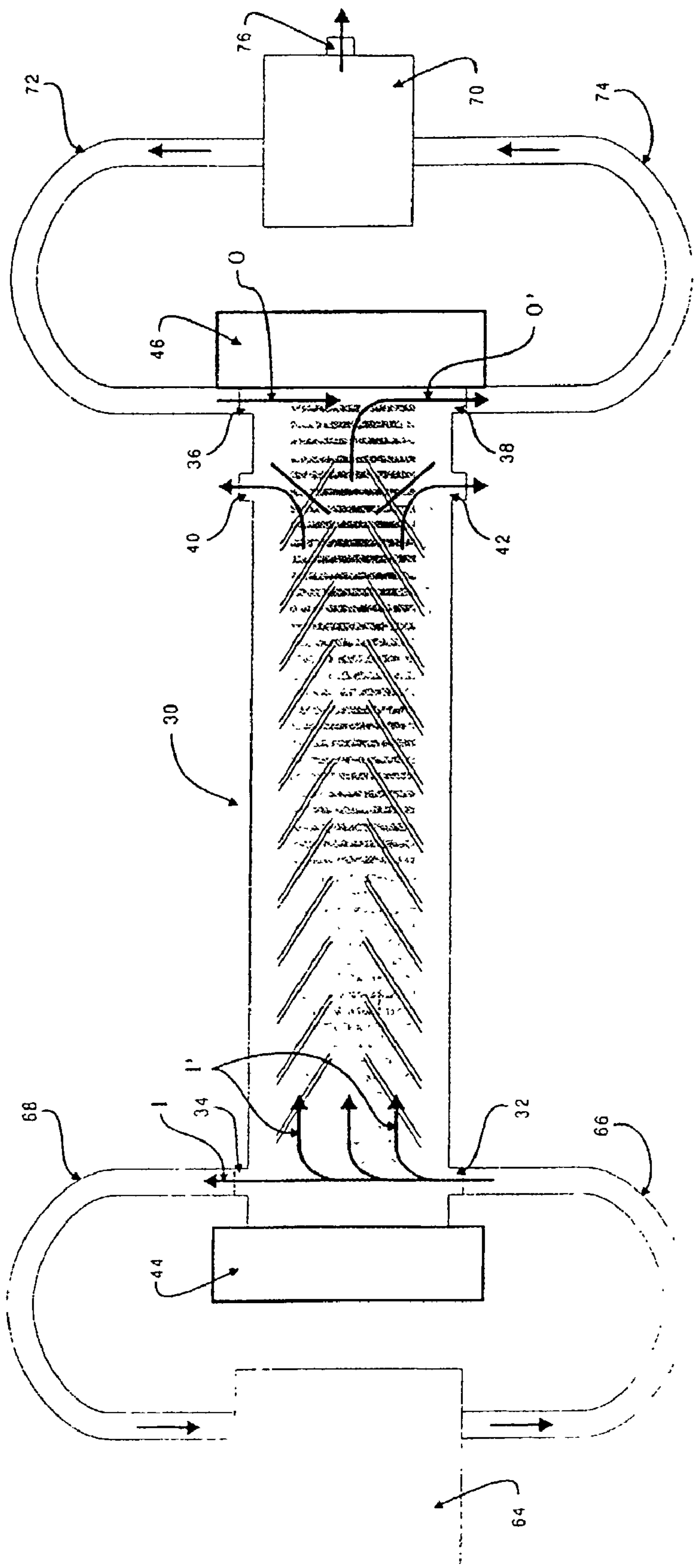

FIG. 4C indicates connection of the electrodes;

FIG. 4D indicates the particle movement;

FIG. 4E shows schematically a complete separation system; and

Figure 5:
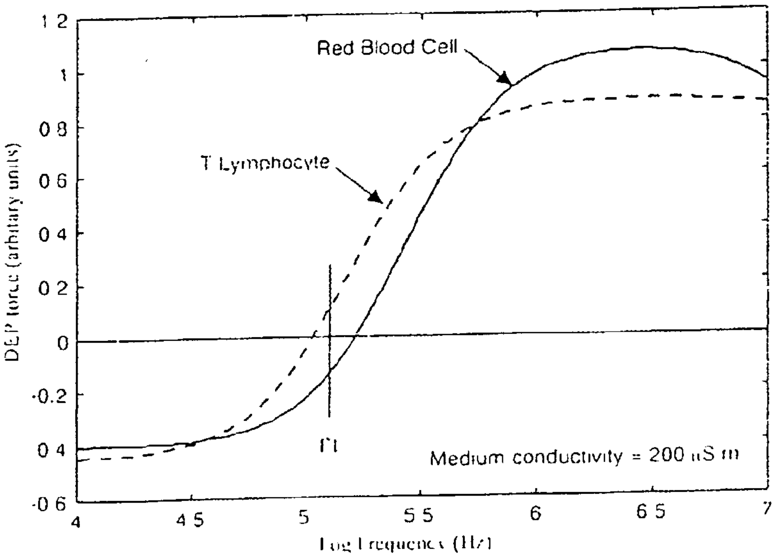

FIG. 5 shows DEP spectra of the particles.

Figure 1:
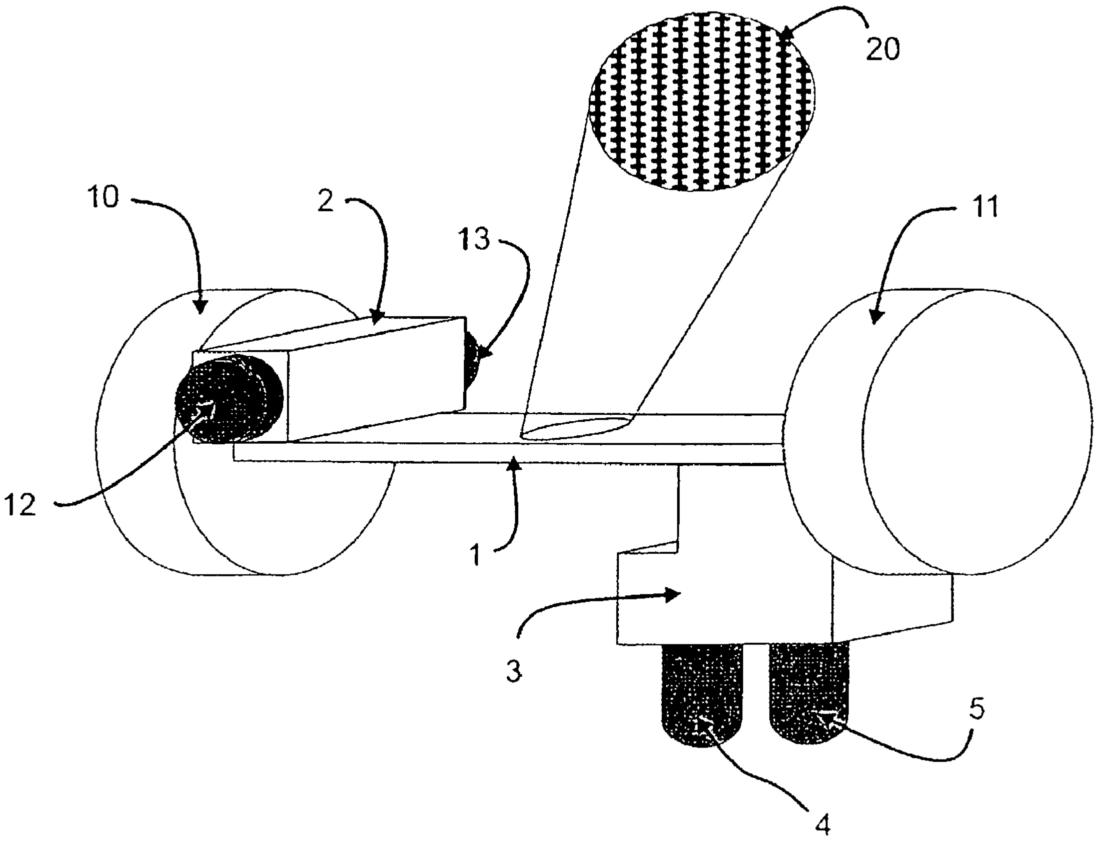
FIG. 1 shows a simple separation device.

Referring to FIG. 1, this shows diagrammatically a separation unit consisting essentially of a central separation chamber 1 which is in liquid communication with an input chamber 2 and an output chamber 3 having two sample output ports 4 and 5. At each end of the chamber 1 are located ultrasonic transducers 10, 11 and likewise two ultrasonic transducers 12 and 13 are located at each end of the input chamber 2 which is mounted transversely with respect to the chamber 1.

On the walls of chamber 1 is an array of castellated electrodes of appropriate size and spacing to enable dielectrophoretic forces to be exerted on particles within the chamber 1 when appropriate alternating electrical potentials are applied to the electrodes. The electrode array is illustrated diagrammatically in magnified scale at 20 in FIG. 1.

For the sake of simplicity, means for feeding a liquid with particles suspended in it to the input chamber 2, through the separation chamber 1 and then through the output chamber 3 are omitted, as are any of the electrical connections necessary to drive the transducers and to apply the alternating voltages to the electrode array illustrated at 20. Also not shown in the diagram are means for selectively opening outlets 4 and 5 from the outlet chamber 3.

In use of the apparatus, a sample of liquid containing suspended particles is placed in chamber 2. By applying appropriate signals to transducers 12 and 13, an ultrasonic frequency standing wave may be set up within the volume of liquid in chamber 2. This standing wave causes the particles either to move to areas of low ultrasonic pressure or to areas of high ultrasonic pressure depending on their relative acoustic properties and accordingly causes the particles to group together in bands. Once grouped, the individual particles can be considered as larger group particles which can be sedimented and controlled more easily. They may then be moved in a controlled manner, by sedimenting them from the suspending liquid, in chamber 2 and re-suspending them into the liquid of chamber 1. Prior to any separation, a liquid fills all of chambers 1, 2 and 3 and output point 4, 5.

Once introduced into the separating chamber 1, the transducers 10 and 11 are driven with an appropriate signal to generate an ultrasonic standing wave which moves along the length of the chamber from left to right. Provided that the vertical dimension (as shown in FIG. 1) of chamber 1 is in the range of the wavelength of the ultrasound produced by transducers 10 and 11, the particles are pushed towards the walls of the chambers 1 on which the electrode array 20 is located. By applying electrical signals to the electrode array 20 of appropriate frequency and amplitude, and by adjusting the signals applied to transducers 10 and 11, it is possible to subject the particles adjacent the electrode array to both dielectrophoretic and ultrasonically generated forces. In particular, particles of specific properties may be held on the electrode array while other particles which do not have those properties may be moved along chamber 1 away from input chamber 2 and towards output chamber 3, in a moving ultrasonic standing wave.

On reaching the end of chamber 1, the particles reach a barrier preventing them from passing any further. This barrier may be of a thin material and of similar acoustic properties to that of the suspending medium (to thus present minimal disruption to the ultrasonic field), such as an adapted thin glass microscope coverslip. The particles will then start sedimenting toward collection ports 4 and 5. Between collection ports 4 and 5 and the main chamber 1 is a switching valve system in the form of a flap. This directs the particles toward either port 4 or 5 for collection. In this instant, particles are directed toward port 4.

Thereafter, output port 4 is closed and output port 5 opened and the electrical signals applied to transducers 10 and 11 and to electrode array 20 may be varied to release the previously held particles and accordingly enable them to be collected from port 5. Thus, if at ports 4 and 5 suitable collection receptacles such as bijou bottles are located, the particles will sediment into them. Particles of one type will sediment at port 4 and particles of a different type will sediment at port 5.

Using appropriate programmed control, the apparatus shown in FIG. 1 may be used sequentially to treat a number of batches of liquid each containing both types of particle to produce two containers, one of which contains a desired particle type(s) and the other of which contains the undesired particle types.

Figure 2:
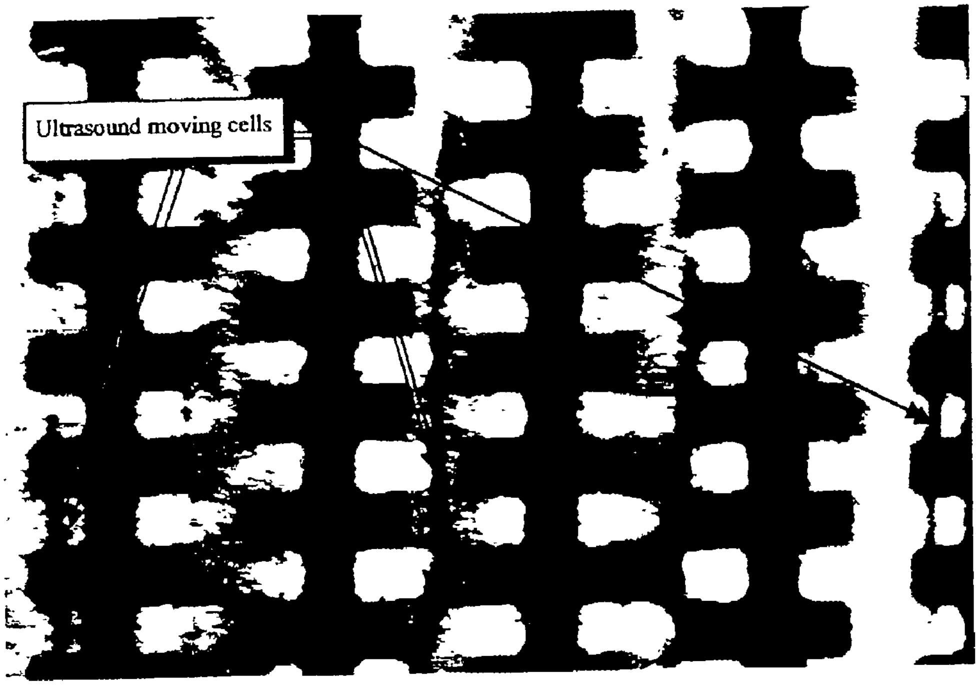
FIGS. 2 and 3 are photographs taken through the electrode array showing particle distribution around the electrodes.
Figure 3:
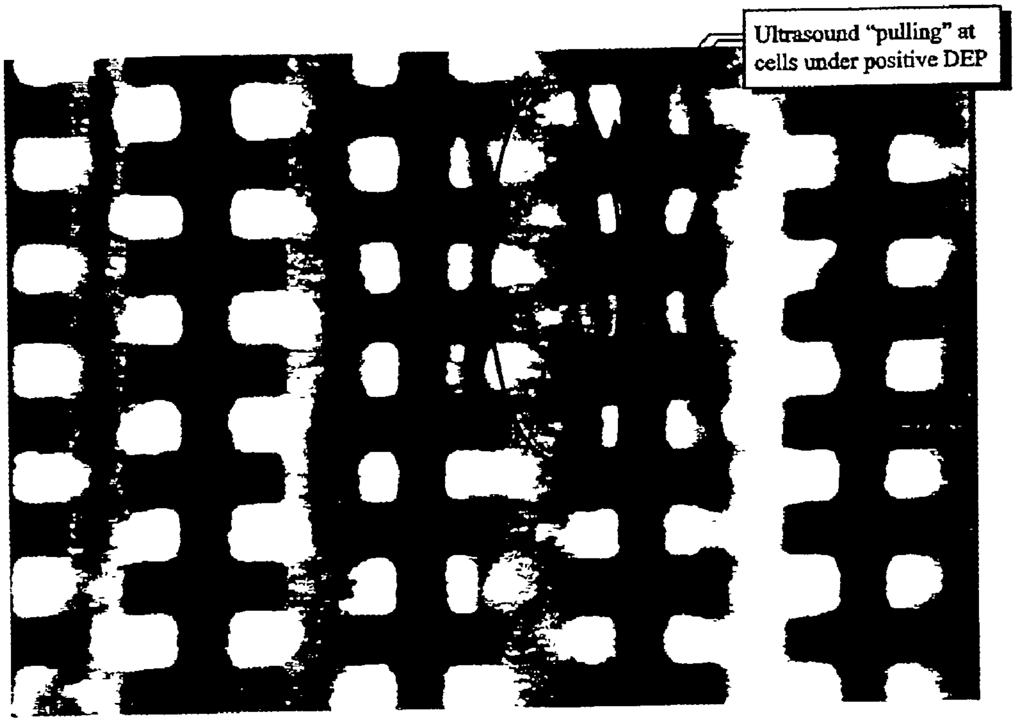

Shown in FIGS. 2 and 3 are photographs showing the electrode array 20, in each case showing just four individually castellated electrode strips, and wherein the illumination has been adjusted to show the presence of yeast cells as pearl grey areas against the clear liquid background and between the darker grey castellated electrodes.

FIG. 2 shows a stage in the procedure where a sample of suspended yeast cells, some alive and some dead, has been introduced into the chamber and subjected to both ultrasound and dielectrophoretic forces. As can be clearly seen, the effect of the ultrasound is to group the cells into bands parallel to the longitudinal extension of the castellated electrodes. The cells, once in these bands are subjected to dielectrophoretic forces and these may be adjusted so that the cells are moved to be held by the array. In the example of FIG. 2, the alternating electrical potential applied to the electrodes is a potential of three volts oscillating at a frequency of 500 kHz in a medium of conductivity 50 μs/cm. As can be seen, the greyish bands of cells concentrate between the castellated electrodes and held by positive DEP forces.

After an appropriate time period, e.g. 1 to 20 seconds, the alternating voltage applied to the electrode array 20 is changed to one of e.g. twelve volts peak to peak and a frequency of six MHz. This causes live yeast cells to be held stationary relative to the electrode array rather more strongly than dead yeast cells. By suitably driving the transducers 10 and 11 at the end of the chamber 1, the standing ultrasonic wave may be caused to travel away from chamber 2 and towards chamber 3 sweeping dead yeast cells along the chamber as it does so. These accordingly arrive in chamber 3 and can be removed. Meanwhile, the live yeast cells are held in the electrode array, from which they can subsequently be removed when desired by changing the voltage and frequency applied to that electrode array, whereafter they may be collected on output chamber 3 likewise.

FIG. 3 shows the ultrasound "pulling" at, and moving the cells held by the electrodes by positive DEP forces, as is shown. This clearly shows the level of control attainable by utilising the ultrasonic and dielectrophoretic forces in combination, where particles held by strong positive DEP, by marginally differing values, can be discriminated and separated. This level of control is not only desirable, but has much application.

The above explanation demonstrates how the apparatus of FIG. 1 may be used to effect separation of particles within a batch of liquid introduced into chamber 2. In an alternative approach, a quantity of particles in suspension may be introduced from chamber 2 into chamber 1 and brought e.g. by ultrasonic sedimentation and movement to the electrode region. The particles in liquid suspension may then be moved backwards and forwards along chamber 1 using ultrasonic standing waves generated by transducers 10 and 11 and this combined with appropriate signal application to the electrode array 20 may enable particles to be selectively held when the travelling wave is moving in one direction and released when moving in the other. Thus, one particle type may be moved towards one end of the chamber 1 and other particle types to the other end of chamber 1. If the particles from chamber 2 are introduced somewhere into the middle section of chamber 1, the apparatus may be operated continuously with two separated streams of particles being collected at locations at either end of chamber 1. Alternatively, this process may also be achieved by introducing particles by means of fluid flow into chamber 1, when chamber 2 is not required. This can be advantageous where the particles, for example, are already suspended in a medium of the desired conductivity and re-suspension is not required.

The movement of the standing wave may be achieved by a number of known electronic techniques; phase sweeping, frequency sweeping or frequency offsetting of the relative signals applied to the transducers 10 and 11, or alternatively mechanically by changing the chamber dimensions. Similarly the standing ultrasonic wave may be generated by a single transducer and a reflector, or two or more transducers.

In a variation for use with fragile particles, such as blood cells, or where minimising trapping and/or sticking of particles to the chamber walls and/or electrodes is critical, the ultrasound may be used to move the particles toward the centre of the chamber, instead of towards the chamber walls. In this case, either a higher ultrasonic frequency (for a chamber of unchanged dimensions), or increased chamber height, may be utilised to meet this objective. In these circumstances, where particles are towards the centre of the chamber, it is advantageous to minimise the modulation of the chamber walls, thus preferably the chamber may be made of a material of low Young's modulus, such as a soft plastic.

Conversely, if the particles are moved toward the chamber walls, it is beneficial to maximise the modulation of the walls. The chamber is preferably made of a material of a high Young's modulus, such as glass.

It has been found that vibration of the chamber walls can additionally help minimise particles sticking to the walls, the chamber walls may be vibrated with this purpose in mind, either utilising the transducers used for producing the standing wave in the chamber, utilising an external transducer, or manufacturing the walls of the chamber from a piezoelectric material.

Vibration of the chamber walls may also be beneficial after a separation is completed, whereby very high power ultrasound can be utilised for the purpose of damaging and/or disintegrating and/or dissolving the particles left in the middle of the chamber and/or on the chamber walls. Ultrasonic cleaning and/or sterilisation of the chamber after dielectrophoretic separation can thus be achieved.

One or more of these variants may be used in combination, such that, for example, the ultrasonic frequency may be changed, with one separation being undertaken with the particles primarily formed in the centre of the chamber and moved by the ultrasound, followed by a second separation being undertaken with the particles primarily forming on the walls of the chamber and there moved by the ultrasound standing wave. Utilising one or more variants is beneficial for complex separations.

It has been found that heating presents a considerable problem when utilising ultrasound. This is mainly due to the acoustic impedance of efficient piezoelectric ultrasonic transducers such as PZT, being vastly different to the acoustic impedance of the propagation medium in which the particles are suspended, i.e. water. This results in a mismatch at the interface, with a considerable amount of the energy being reflected back and dissipated as heat.

Acoustic impedance can be considered as an analogue of electrical impedance and thus the principles of radio frequency impedance matching can be applied, as is known. Using these principles, it was calculated in the order of 92% of the energy transmitted by a PZT transducer is reflected back at the water interface and dissipated as heat. By using two layer impedance matching, bonding a quarter wave ($\lambda/4$) section of aluminium on to the front of a PZT transducer and bonding a $\lambda/4$ section of PMMA on top of this, the situation may be considerably improved, where $\lambda$=wavelength. The choice of using aluminium is because its acoustic impedance is between that of PZT and water and using polymethyl methacrylate (PMMA) because it is between that of aluminium and water. So essentially the impedance of the aluminium is matched to the PZT, the PMMA to the aluminium, and then the PMMA to the water. This reason for the $\lambda/4$ thickness or odd multiples of (i.e. $\lambda/4$, $3\lambda/4$, $5\lambda/4$, etc.) is well-known.

Two layer impedance matching, using aluminium and PMMA was found to improve matters considerably, with around 92% of energy now being transmitted. Efficiency was thus considerably improved and heating minimised.

Alternative materials to aluminium and PMMA may be used for this purpose, as may additional matching layers be used to improve efficiency further.

It has been found by mathematically modelling the sound waves within the chamber that utilising impedance matching offers additional benefits, not just that of minimising heating. A sound wave travelling down a chamber moves in both time and in space. On reaching the end of the chamber, it will be reflected and thus travel back down the chamber from the direction which it came. It will then constructively and destructively interfere with the outward travelling wave and when averaged over time, it will produce what is known as a standing wave. For this reason, chamber 1 and chamber 2 of FIG. 1 may alternatively be implemented with a single transducer and reflector for each, with two opposing transducers not being required, but preferred. When two opposing transducers are used, the reflections at the ends of the chamber are detrimental. From modelling these effects, it was found that when using phase sweeping to move the standing wave, as the phase was changed over a cycle (I.e. 0 to 360 degrees), the amplitude of the standing wave was changed noticeably. This was a result of the second, third and fourth order, etc. reflections from the face of the opposing faced transducer interfering with the primary transmitted waves. By using impedance matching on the face of the transducers (as already outlined), these secondary reflections are minimised. The result is that the amplitude of the standing wave remains relatively constant over a cycle, with significant improvements to the level of control of particles achieved.

The application of impedance matching for combined ultrasound and dielectrophoretic separations is therefore preferred. The benefits of using impedance matching not only applies to phase sweeping, but includes all other methods of electrical and mechanical control of the standing wave, and when one or more transducers is used.

Referring to FIG. 1, as a variation, a vertical chamber may instead be used for chamber 2, rather than the horizontally mounted chamber which is generally preferred. The use of a vertical chamber typically results in particles having to move greater distances. It has been found that when moving bands of particles over greater distances, the breaking up of these bands is more likely to occur, with sedimentation efficiencies effected.

Sedimentation in chamber 2 can be achieved by either utilising a moving standing wave, combination of a moving standing wave and a stationary standing wave, or by pulsing the signals applied to the ultrasonic transducers 12, 13. The pulsing of the signals results in the standing wave momentarily being removed, with the particles sedimenting but also dispersing from their bands. The process of applying the standing wave, momentarily removing it, then re-applying (i.e. the result of pulsing of the signal), allows the particles to sediment in a controlled manner.

It is preferred that the chamber be circular in cross-section, thus to form a barrel shaped chamber. Improved sedimentation time and efficiency result. Preferential conditions can further be improved by using a Bessel sound field. By making the region of the ultrasonic transducer which is excited equal to ⅔ of the diameter of the chamber, and also (not necessary, but preferred) the diameter of the transducer which is excited equal to three times the thickness of the transducer, a Bessel sound field is generated, producing maximum pressure in the centre of the chamber and minimal pressure at the chamber wall, as is well-known. This concentrates the particles toward the central region of the chamber, allowing further improved sedimentation and control.

Additionally significant improvements to sedimentation efficiency is achieved when impedance matching is used, matching the impedance of the transducer to the suspending medium. This improves efficiency of the transfer of sound energy into the chamber, thus reducing heating. Heating not only affects for example the integrity of biological cells, but results in producing regional fluid movement within the chamber, which in turn disrupts the bands and has a marked effect on control and sedimentation efficiency. By placing a thin barrier such as a glass microscope coverslip (approx. 0.1 mm thick) in front of the transducers, enclosing a fixed volume of liquid isolated from the main chamber, the effects of heating and the disrupting of cell banding can be significantly reduced further. The use of a thin barrier enclosing a fixed volume of liquid in front of the transducers, and its benefits, applies equally to use in chamber 1 where particles are being separated, as it does to use in chamber 2 where particles are being sedimented and re-suspended. It is thus preferably used in both chambers.

The above variations may be used individually and in combination. When all combined, very high sedimentation efficiencies can be achieved. Efficiencies of greater than 99% (percentage of particles removed from suspension) may be obtained for particular particles and concentrations.

All the above aforementioned examples of using ultrasound in conjunction with dielectrophoresis apply equally to static DEP fields (i.e. where a stationary non-travelling field is applied to the electrodes), as it does to travelling wave dielectrophoresis (TWD) where travelling fields are employed. Travelling fields are produced by applying multi-phased signals to adjacent electrodes, as is well known in the field of dielectrophoresis. As such, ultrasound may be used in conjunction with TWD to perform particle separation. For example, in FIG. 1, the electrodes 20 of chamber 1 may be replaced by straight parallel electrodes along the chamber's length, with these electrodes in turn being connected to a multi-phased signal to generate a travelling field. Particles introduced to chamber 1 may then be separated by a combination of ultrasonic and TWD forces.

Particles in chamber 1 of FIG. 1 may also be separated by applying the principles of field flow fractionation (FFF) combined with dielectrophoresis (DEP). In this case, ultrasound is used to transport the particles rather than bulk fluid flow. Bulk fluid flow and ultrasound may also be used in combination with dielectrophoresis.

Changes in the suspending medium properties in chamber 1 can have a marked effect on particle separations and efficiency. Referring to FIG. 1, when performing a separation in chamber 1 of combined ultrasound and DEP, it may also be beneficial to introduce fluid flow. For example, a small amount of fluid flow may be introduced along the chamber to stabilise the properties of the suspending medium. When chamber 2 is used to re-suspend particles from an unknown suspension medium into chamber 1 which contains known medium, the particles are likely to bring with them additional items which can change the suspending medium's physico-chemical properties, for example excess ions, which can change the conductivity. To offset the effect of this fluid of known property can be introduced into chamber 1. Fluid flow may also be introduced in chamber 1 as an additional force in combination with ultrasound and dielectrophoresis.

Referring to FIG. 1, fluid flow used in conjunction with chamber 2 may also be beneficial for continuous separation.

This method has certain advantages over a batch process, in which 10 ml of suspended particles is repeatedly introduced the particles sedimented into chamber 1 and the fluid removed and replaced with another suspension. For continuous separation, chamber 2 can remain filled with fluid and suspended particles continuously flowed into this chamber and sedimented with ultrasound.

A number of options are available when it is desired to perform combined ultrasonic and dielectrophoretic separations with the particles first formed in the centre of the chamber, and then, at a later stage, the particles formed on the walls of the chamber, or vice versa. One option is to change the dimensions of the chamber, but more preferable is to change the ultrasonic frequency to achieve this. The efficiency of the transducer may be reduced which would enable it to be used over a wider frequency range. Alternatively, the same high efficiency transducer may be used, but the harmonics of the transducer excited. For example, a 1 MHz transducer typically has harmonics at just over 3 MHz and 5 MHz. The same transducer may be used at these frequencies, allowing particles to be moved toward the centre or toward the walls of a chamber. It may also be beneficial to not only apply differing frequencies to the transducers at different points in time, but also to apply a combined frequency signal to the transducers at the same time.

Typically, the signal applied to one of the transducers can be considered as the reference and the other signal varied, i.e. phase or frequency swept, or frequency offset, relative to this, in order to move the standing wave and thus particles. As a further variation, both signals may be varied relative to each other at the same time. The result is either particles moving toward the centre of the chamber from both ends (at the same time), or the movement of particles from the centre toward either end. The same effect may also be achieved mechanically. Such an approach can be particularly valuable when applying a variation of FFF (field flow fractionation).

FIG. 4 shows a device based on negative dielectrophoretic (DEP) forces for separation of two or more particle types. FIG. 4A shows a chamber 30, typically comprising upper and lower glass substrates sandwiches together to leave a central gap of 100 to 300 microns. The chamber has a first pair of cross flow ports 32, 34 at an input end, and a second pair of cross flow ports 36, 38 at an output end. At the output end and upstream of the ports 36, 38 are two output ports 40, 42 at opposite sides of the chamber.

At each end of the chamber 30, there is an ultrasonic transducer 44, 46 operable to generate in the chamber a standing wave having nodes and anti-nodes indicated by the thick bars 48; the standing wave is arranged to move from left to right in the figure.

If a particle suspension is caused to flow from port 32 to port 34 as shown by the arrow I, then the moving standing wave between transducers 44 and 46 may remove the particles from this cross fluid flow suspension and divert them along the chamber as shown by the arrow I'.

FIG. 4B shows the DEP electrodes 50 arranged in pairs along opposite sides of the chamber 30 at angles to the direction of flow to form a fishbone array. The electrodes extend at an angle across the direction of movement of the particles caused by the ultrasonic field, except for a central strip which has no electrodes. FIG. 4C shows that electrodes of each pair are connected to opposite sides of an AC signal source 52 by connectors 54, 56. The connections form a mirror image across the array so that in all of the electrode pairs, the upstream electrode is connected to the same side of the source 52.

The gap between individual electrode pairs is significantly less than it is between adjacent electrode pairs, as is seen for the electrodes 50 shown in FIGS. 4*b*, 4*c* and 4*d*. For example, 40 μm wide electrodes, 40 μm gap between the electrode pairs and 250 μm between adjacent pairs. By applying a signal of a desired frequency, a strong (relative) negative DEP force will be generated in the region between the electrode pairs. However, between adjacent pairs, the gap is significantly greater and so a very much weaker negative DEP force is generated. The result of this is that as particular particle passes along the chamber, it will see the regions between the electrode pairs as being "walls", or very strong barriers of negative DEP, repelling it from these regions. With the electrodes slanted at an angle toward the centre of the chamber, the particle will be guided toward this region in the centre of the chamber by the barriers of negative DEP.

Suppose there are two types of particle in the suspension and that a signal frequency is chosen at which one particle, type S, experiences a strong negative DEP force while the other particle type W experiences a weak negative DEP force. As both types are moved along the chamber 30 and across the electrodes 50, type S particles will be guided preferentially towards the centre of the chamber as indicated in FIG. 4D by the arrows G, while type W particles will pass along the chamber as they are relatively unaffected. The result is that there is a particle concentration effect.

Referring once more to FIG. 4B, between ports 40 and 36 on one side of the chamber and between ports 42 and 38 on the other side are a pair of angle barriers 60, 62 arranged to divert particles near the edges of the chamber 30 out through the ports 40, 42. The barriers are of a material of similar acoustic impedance to water, for example glass, and are thin in comparison with the wavelength of the applied ultrasonic wave so as to cause minimal disturbance to the moving standing wave.

To assist with the removal of particles at ports 40 and 42, a small amount of fluid may be extracted from these ports with fluid introduced at additional ports downstream of ports 32 and 34 to account for this (not shown). The level of fluid flow used for this purpose will typically be small in that it will not affect the separation in chamber 30. Alternatively, as a variation, TWD (travelling wave dielectrophoresis) electrodes may be used to remove these particles at ports 40 and 42, or both fluid flow and TWD used in combination.

Further downstream of the ports 40, 42, a cross flow of fluid is established between ports 36, 38 as indicated by the arrow O. Particles passing along in the ultrasonic field will reach a barrier in front of transducer 46.

They will be unable to pass any further and will be removed by the cross fluid flow through port 38. The barrier may be similar to that of 60, 62, for example, of thin glass or thin polyimide film; a typical thickness of 100 μm.

Thus an enriched stream of type S particles is separated from the type W particle stream.

FIG. 4E illustrates schematically the entire flow system. An input chamber 64 contains a suspension of type S and type W particles to be separated and is connected by pipe 66, 68 to the cross flow ports 32, 34. At the output end of the chamber 30 is an optional secondary DEP separation and purification stage 17 connected by pipe 72, 74 to the cross flow ports 36, 38 and having an output port 76. If a secondary separation is not essential, then port 38 can constitute a direct output port.

The use of negative DEP force in a separation process is particularly effective when particles in high concentration are to be separated, for example at a concentration of 100 million particles per milliliter or more, and when a large volume of suspension is to be processed, typically tens of milliliters of suspension.

Referring to FIG. 4*e*, the implementation is particularly versatile in that it allows for continuous separation to be performed. The suspending medium properties of the cross fluid flow between ports 32 and 34 may be different to that of the central chamber 30. Additionally, the suspending medium properties of the cross fluid flow between ports 36 and 38 may be different again from both that of the chamber 30 and between ports 32 and 34. This allows, for example, particles suspended in an unknown fluid to be introduced into chamber 64.

This suspension is then flowed across chamber 30 between ports 32 and 34. The conductivity and other physico-chemical properties of the suspending medium in chamber 30 are chosen to be preferable for the separation of these particles. The particles in the cross fluid flow between ports 32 and 34 are removed and taken along the chamber in the ultrasonic standing wave. As the particles pass over the electrodes 50, those of the desired type are enriched in the centre of the chamber and pass to the end. When these particles reach the end of the chamber, they are removed from the chamber by the cross fluid flow between ports 36 and 38, and passed into chamber 70. The conductivity and other physico-chemical properties of the suspending medium in chamber 70 and thus also the fluid flowing between ports 36 and 38 is chosen to be preferable for a secondary DEP separation stage, such as a TWD (travelling wave dielectrophoresis). Additionally, the flow rate between ports 32 and 34 can be varied and adjusted to compensate for differing concentrations of particles in the solution contained in chamber 64, and so essentially a vast range of particle concentrations can be handled from chamber 64, whilst the concentration of the particles in chamber 30 may remain constant. The rate at which the standing wave travels along the chamber can also be adjusted in line with this. The result of this is that optimum separation conditions can be achieved, even when the sample introduced is of varying conductivity and varying suspending medium properties, and that a prior stage to re-suspend the particles and/or dilute and/or enrich the sample is not required. Similarly, the flow rate between ports 36 and 38 may also be adjusted.

As a further variation, ports 32 and 34, and/or ports 36 and 38, may be moved from those shown in FIG. 4*e* so that the cross fluid flow between the port pairs may be at an angle relative to the length of chamber 30 and the ultrasonic standing wave. This can be beneficial to the efficiency of introducing and/or removing particles from the ultrasonic field in chamber 30.

As a further variant, the volume of fluid in this system may also be fixed and enclosed in that fluid flowing between ports 32 and 34 and chamber 64 is fixed, as is the fluid flowing between ports 36 and 38 and chamber 70. The result of this is that the application of fluid flow does not result in dilution of the sample. When a non-enclosed system is used, considerable dilution of the sample can result.

FIG. 4*c* shows electrodes of each pair connected to opposite sides of an AC signal source. Additionally, the electrode of the adjacent pair is also connected to the opposite side of the AC signal source, as shown in FIG. 4*c*. This means that not only will a DEP force be generated between the electrode pair, but a much weaker DEP force will be generated between the electrodes of adjacent pairs. The electrodes may alternatively be connected so that no DEP force is generated between the electrodes of adjacent pairs. This is achieved by connecting the electrodes such that the electrode of the adjacent pair is connected to the same side of the AC signal source. They will thus be at the same potential and no DEP force will result between them.

Additionally, as a further variant, the dielectric properties of one or more of the particles being separated may be altered to achieve a desired separation. This may include factors such as changing the physiological properties of the particles, stressing the particles, changing the temperature of the sample, adding chemicals to the particle suspension, attaching additional particles such as antibodies or proteins, or, more particularly, for biological particles, the selective killing or damaging of specific particles to thus enhance a separation, an example of which may be the stressing or lysing of red blood cells.

In general, practical application of ultrasound for particle manipulation has been found to be preferable in the lower MHz frequency range (typically 1 MHz to 6 MHz), particularly for biological cells or micron or sub-micron particles, as is well-known (Peterson et al, Development of an ultrasonic blood cell separator, IEEE 8th annual conference of the Engineering in Medicine and Biological Society, 1986, pages 154–156, particularly page 154).

As an example, FIG. 5 shows dielectrophoresis spectra expected for human red blood cells (rbc's) and T-lymphocytes white blood cells (wbc's) in a medium of conductivity 200 $\mu$S/cm. The T-lymphocyte spectra is shown as a dotted line, whilst the red blood cell (rbc) spectra is shown as a solid line. For the separation of these two particles, the preferred case is where one of the particle types is held by a positive DEP force, whilst the other feels a negative DEP force being pushed away from the electrodes. The frequency which would preferably be used for separating these two particles is indicated as F1, approximately 130 kHz.

It is seen from FIG. 5 that the ultrasound frequency (typically 1 to 6 MHz—corresponding log value 6 to 6.8) is vastly different to the DEP preferred frequency 130 kHz, F1 (log value 5.1). Different frequencies for the ultrasound and DEP are preferred.

What is claimed is:

1. A method of manipulating particles comprising subjecting particles suspended in a liquid to a moving ultrasonic standing wave and to a varying electrical field capable of generating a dielectrophoretic force on the particles, wherein the moving ultrasonic standing wave and the varying electrical field are applied simultaneously, and further comprising applying the moving ultrasonic standing wave so as to move both types of particles across an electrode array, and applying to the electrode array an electrical signal at such a frequency that one type of particle experiences a strong negative DEP force and is diverted into one region of the electrode array while the second type of particle experiences a weak negative DEP force and is relatively unaffected as the second type of particle is moved across the array.

2. Apparatus for treating particles suspended in a liquid comprising a chamber, means for feeding suspended particles into and out of the chamber, an electrode array on at least one wall of the chamber, means for applying to the electrode array an alternating electrical potential whereby to generate in suspended particles adjacent to the array a non-uniform alternating electric field so as to induce a dielectrophoretic force, and means for subjecting the liquid in the chamber to a moving ultrasonic standing wave, and wherein the chamber is a rectangular separation chamber, there being a pair of ultrasonic transducers arranged one at each end thereof, and in which the means for feeding suspended particles into the separation chamber comprises an input chamber mounted transversely to the separation chamber, the input chamber having a pair of ultrasonic transducers arranged one at each end.

* * * * *